(12) United States Patent
Scaramozzino et al.

(10) Patent No.: US 10,054,184 B2
(45) Date of Patent: Aug. 21, 2018

(54) GUIDING AND SEALING UNIT, PARTICULARLY FOR A SHOCK ABSORBER ROD

(71) Applicants: Francesco Scaramozzino, Villanova d'Asti Asti (IT); Alberto Dequino, Pinerolo (IT)

(72) Inventors: Francesco Scaramozzino, Villanova d'Asti Asti (IT); Alberto Dequino, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 64 days.

(21) Appl. No.: 15/292,896

(22) Filed: Oct. 13, 2016

(65) Prior Publication Data
US 2017/0108073 A1 Apr. 20, 2017

(30) Foreign Application Priority Data
Oct. 15, 2015 (IT) .................. 102015000062155

(51) Int. Cl.
| | |
|---|---|
| *F16F 9/36* | (2006.01) |
| *F16F 15/14* | (2006.01) |
| *F15B 15/14* | (2006.01) |
| *F16J 15/3232* | (2016.01) |
| *F16J 15/3252* | (2016.01) |
| *F16J 15/56* | (2006.01) |

(52) U.S. Cl.
CPC .......... *F16F 9/362* (2013.01); *F15B 15/1461* (2013.01); *F16F 9/363* (2013.01); *F16J 15/3232* (2013.01); *F16J 15/3252* (2013.01); *F16J 15/56* (2013.01); *F16F 2224/02* (2013.01); *F16F 2224/025* (2013.01); *F16F 2224/0208* (2013.01); *F16F 2230/30* (2013.01)

(58) Field of Classification Search
CPC .............. F16F 9/36; F16F 9/362; F16F 9/363
See application file for complete search history.

(56) References Cited

U.S. PATENT DOCUMENTS

| | | | | | |
|---|---|---|---|---|---|
| 4,055,352 | A | * | 10/1977 | Allinquant | F16F 9/364 188/322.17 |
| 4,508,020 | A | * | 4/1985 | Szcupak | F16F 9/363 188/322.17 |
| 4,542,811 | A | * | 9/1985 | Miura | F16F 9/364 188/315 |
| 4,880,087 | A | * | 11/1989 | Janes | B23P 19/04 188/322.16 |

(Continued)

*Primary Examiner* — Thomas J Williams
*Assistant Examiner* — James K Hsiao
(74) *Attorney, Agent, or Firm* — Bryan Peckjian; SKF USA Inc. Patent Dept.

(57) ABSTRACT

A guiding and sealing unit for a shock absorber rod, including a bushing and a sealing assembly including a sealing ring made of an elastomeric material and having at least one annular lip that projects radially and axially towards an axis of symmetry (A) of the unit, and an annular shield that supports and is integral with the sealing ring is provided. The annular shield is formed by a metallic sleeve having a first axial end portion that integrally supports the sealing ring, and from which the annular lip extends in a cantilever fashion inside the metallic sleeve, and a second end portion that integrally houses the annular bushing inside itself.

9 Claims, 1 Drawing Sheet

(56) References Cited

U.S. PATENT DOCUMENTS

| | | | | |
|---|---|---|---|---|
| 5,176,229 A * | 1/1993 | Kanari | ............... | F16F 9/364 |
| | | | | 188/315 |
| 5,178,243 A * | 1/1993 | Hamada | ............ | F16F 9/3242 |
| | | | | 188/315 |
| 5,363,945 A * | 11/1994 | Lizell | ............... | F16F 9/364 |
| | | | | 188/281 |
| 5,664,651 A * | 9/1997 | Miura | ............... | F16F 9/363 |
| | | | | 188/322.17 |
| 6,003,848 A * | 12/1999 | Cotter | ............... | F16F 9/0218 |
| | | | | 188/322.16 |
| 6,158,559 A * | 12/2000 | Asa | ............ | F16C 29/02 |
| | | | | 188/322.17 |
| 7,997,393 B2 * | 8/2011 | Hart | ............... | F16F 9/3285 |
| | | | | 188/267.2 |
| 8,079,598 B2 * | 12/2011 | Murakami | ............ | F16F 9/363 |
| | | | | 188/322.17 |
| 2002/0053495 A1 * | 5/2002 | Kachi | ............... | F16F 9/3242 |
| | | | | 188/322.17 |
| 2003/0024780 A1 * | 2/2003 | Yasuda | ............... | F16F 9/062 |
| | | | | 188/322.17 |
| 2004/0112695 A1 * | 6/2004 | Niwa | ............... | F16F 9/366 |
| | | | | 188/322.17 |
| 2006/0231361 A1 * | 10/2006 | Kojima | ............... | F16F 9/084 |
| | | | | 188/322.19 |
| 2014/0216872 A1 * | 8/2014 | Kani | ............ | F16F 9/36 |
| | | | | 188/322.16 |

\* cited by examiner

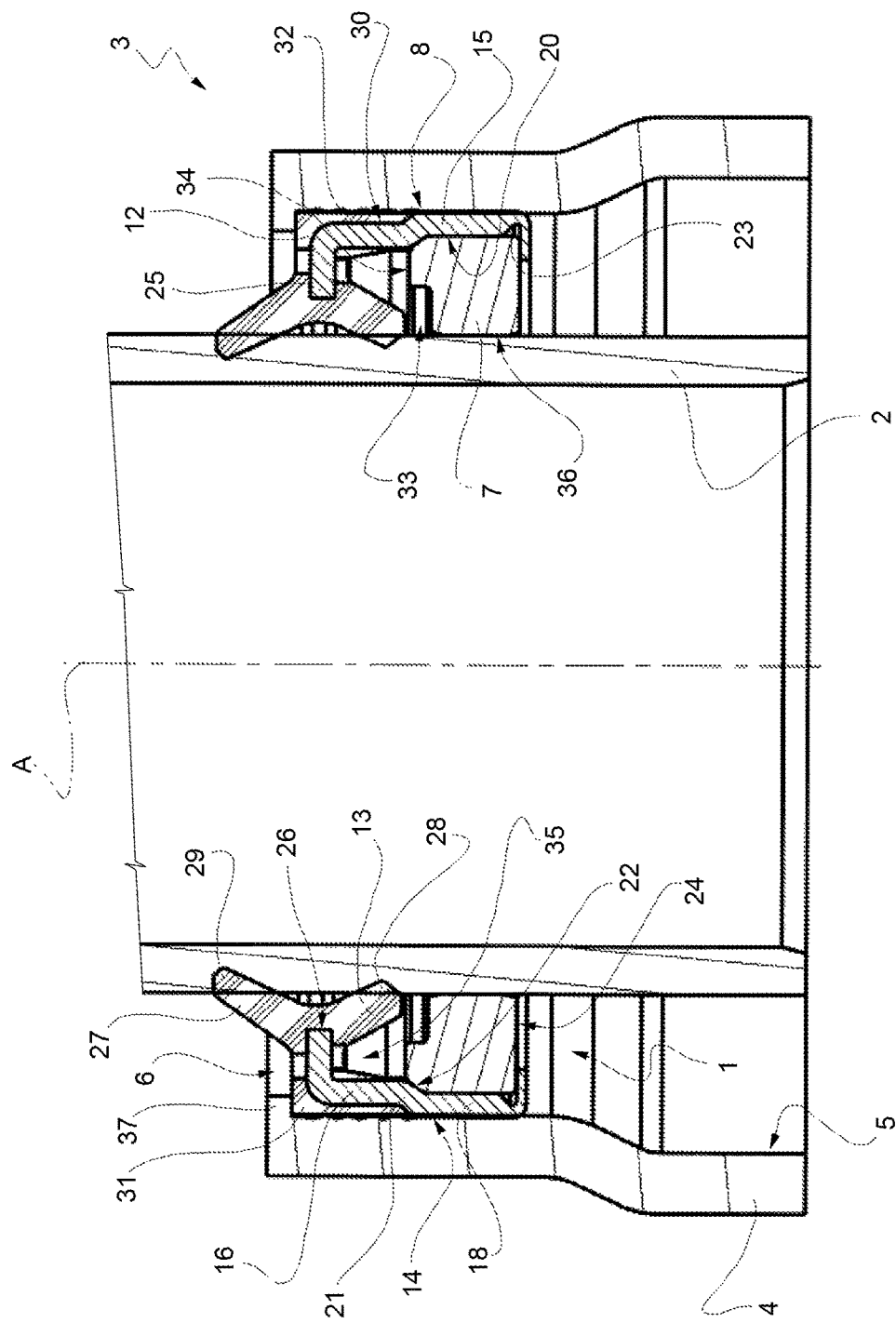

GUIDING AND SEALING UNIT, PARTICULARLY FOR A SHOCK ABSORBER ROD

CROSS REFERENCE TO RELATED APPLICATIONS

This application claims priority to Italian patent application no. 102015000062155 filed on Oct. 15, 2015, the contents of which are fully incorporated herein by reference.

FIELD OF THE INVENTION

The present invention relates to a guiding and sealing unit for a rod of a shock absorber, particularly a monotube shock absorber.

BACKGROUND OF THE INVENTION

Hydraulic shock absorbers, for example those of the monotube type widely used in motor manufacturing and other industries, are intended to operate at relatively high hydraulic pressures, of around 20 bar on average, with peaks of as much as 100 bar. Because of these high operating pressures, the seal for the pressurized fluid (usually oil) contained in the shock absorber body, which opposes the reciprocating motion of the piston in the body during use, and the guide for the shock absorber rod are provided by means of a guiding and sealing unit having a bushing that is engaged with the rod which passes through it, and which is then fitted in a fluid-tight manner within the shock absorber body, and a sealing assembly carried by the bushing.

An example of a guiding and sealing unit of this type is described in the German utility model published under the number DE8201327U.

This prior art guiding and sealing unit includes numerous elements to be fitted separately, and is therefore relatively bulky and difficult to fit, while its performance is not entirely satisfactory; these drawbacks are particularly serious in view of the desire to reduce the overall dimensions and weight of shock absorbers for a given working stroke.

BRIEF SUMMARY OF THE INVENTION

The object of the present invention is to provide a guiding and sealing unit for a shock absorber rod which is free of the drawbacks of the prior art, and which in particular is suitable for use in shock absorbers of the monotube type, while having small overall dimensions, particularly in the axial direction, that is to say in the direction of the reciprocating motion of the shock absorber rod, being simple and economical to produce, allowing simple and reliable fitting, and having a high sealing efficiency both in dynamic terms, that is to say in relation to the shock absorber rod, and in static terms, that is to say in relation to the shock absorber body.

On the basis of the invention, therefore, a guiding and sealing unit, particularly for a shock absorber rod, is provided as defined in the attached claims.

BRIEF DESCRIPTION OF THE SEVERAL VIEWS OF THE DRAWING

The invention will now be described with reference to the single FIGURE of the attached drawing, which shows a non-limiting exemplary embodiment of the invention and represents, in elevation and in radial cross section, one end of a shock absorber, particularly a monotube shock absorber, having a guiding and sealing unit for a shock absorber rod according to the invention, push-fitted into a shock absorber body.

DETAILED DESCRIPTION OF THE INVENTION

With reference to the single FIGURE of the attached drawing, the number 1 indicates the whole of a guiding and sealing unit for a rod 2 of a shock absorber 3, which in the illustrated non-limiting example is of the monotube type and is shown only partially for the sake of simplicity, the rest of the shock absorber being known.

In particular, the shock absorber 3 provides a shock absorber body 4 in use, filled with pressurized oil or other fluid and having a piston (not shown) passing through it, and delimited by an inner lateral wall 5. The unit 1 is driven in a fluid-tight manner against the wall 5, thus closing one end 6 of the body 4, and has an axis of symmetry A which defines an axial direction coinciding with the axis of symmetry and axial sliding/translation of the rod 2, which for the sake of simplicity is shown as being cut off axially.

The unit 1 provides an annular rod guiding bushing 7, which, in use, is engaged in a through-manner by the rod 2, and a sealing assembly 8 operatively coupled with the annular bushing 7 and comprising, in turn, a sealing ring 12 made of an elastomeric material and an annular shield 14 that integrally supports the sealing ring 12.

The sealing ring 12 has at least a first annular sealing lip 13 that projects radially and axially towards the axis of symmetry A and which is designed to cooperate, in use, slidingly with the rod 2.

According to a first aspect of the invention, the annular shield 14 is constituted by a metallic sleeve 15 having a first axial end portion 16 (also referred to as "a first axially extending portion" in the claims) and a second axial end portion 18 (also referred to as "a second axially extending portion" in the claims).

The metallic sleeve 15 integrally supports the sealing ring 12 and the annular bushing 7. In particular, the sealing ring 12 is integrally carried by the first end portion 16 so that the first annular lip 13 extends in a cantilever fashion inside the metallic sleeve 15; on the other hand, the annular bushing 7 is housed inside the second end portion 18, integrally coupled with the second end portion 18.

Additionally, the metallic sleeve 15 constituting the annular shield 14 is designed so as to be adapted to be driven in use, in fluid-tight manner, against the lateral wall 5 of the body 4 of the shock absorber 3, so as to be passed through radially on the inside by the rod 2 of the shock absorber 3, the rod 2 cooperating directly with the lip 13.

The metallic sleeve 15 constituting the annular shield 14 is delimited by an annular lateral wall 20 having in radial section a bend 21 (also referred to as "a shoulder" in the claims), the bend substantially being in the shape of an open L-shape in radial section (that is to say, one having an angle of more than 90° between the two arms, or wings, of the rough capital letter L shape) and being arranged between the first axial end portion 16 and the second axial end portion 18. Those of ordinary skill in the art will appreciate that an L-shape, when used herein, refers to the rough shape of a capital, or uppercase, letter "L" in the Roman alphabet.

According to one aspect of the invention, the bend 21 radially forms inside the metallic sleeve 15 and towards the second axial end portion 18 an annular shoulder 22; additionally, the annular bushing 7 is arranged abutting against the annular shoulder 22 defined by the bend 21, and is axially locked against the annular shoulder 22 by means of an annular end edge 23 of the second axial end portion 18, the edge 23 being bent in an L-shape against a first frontal face 24 of the annular bushing 7 facing the side opposite to the first axial end portion 16. A leg of the "L" which lays against the first frontal face 24 is referred to as "a second radially extending flange" in the claims.

The annular end edge 23 is reduced in thickness in the radial direction (that is to say, it becomes less thick) with respect to a substantially constant radial thickness of the annular lateral wall 20 of the metallic sleeve 15 constituting the annular shield 14, and therefore the portions 16 and 18 both have the same radial thickness except at the edge 23.

According to another aspect of the invention, the first axial end portion 16 is bent in an L-shape facing radially inwards so as to form on the side opposite to the second axial end portion 18 an annular flange portion 25 (also referred to as "a first radially extending flange" in the claims), which is embedded in the sealing ring 12 made of elastomeric material so as to constitute a reinforcing armor thereof.

The first annular sealing lip 13 extends radially and axially in a cantilever fashion from a radially inner peripheral edge 26 of the annular flange portion 25 towards the annular bushing 7; additionally, the sealing ring 20 also has a second annular sealing lip 27, which extends radially and axially in a cantilever fashion from the radially inner peripheral edge 26 of the annular flange portion 25 on the side opposite to the annular bushing 7, so as to form with the first annular lip 13, in radial section, a V having its vertex arranged at the radially inner peripheral edge 26 of the annular flange portion 25 and end stretches constituted by respective free ends 28, 29 of the first annular lip 13 and the second annular lip 27 respectively.

The ends 28, 29 face the axis of symmetry A and cooperate, in use, with the rod 2 in a sliding manner with radial interference, and are illustrated in an undeformed configuration which shows, not to scale, the interference planned at the design stage; in use, the lips 13 and 27 are elastically deformed in the radial direction, consequently exerting a sealing pressure on the rod 2 by an elastic effect.

The second annular lip 27 extends in a cantilever fashion for a greater length than the first annular lip 13, so that the V formed by the first and second annular lip 13, 27 is asymmetrical.

The first axial end portion 16 has radially outer and inner transverse dimensions below those of the second axial end portion 18, to which it is connected with continuity by means of the bend 21, so that the second axial end portion 18 radially delimits on the outside of the first axial end portion 16, an annular recess 30, which houses a radially outer annular portion 31 of the sealing ring 12.

The radially outer annular portion 31 of the sealing ring 12 extends radially outside the metallic sleeve 15 constituting the annular shield 14, and is designed to define a radially outer static seal 32 of the sealing assembly 8 adapted in use to cooperate in a fluid-tight manner with the lateral wall 5 of the body 4 of the shock absorber 3.

According to the preferred embodiment of the invention, the annular bushing 7 is made of a synthetic plastic material.

Additionally, the annular bushing 7 is provided towards the first annular lip 13 with an annular shallow recess 33 provided on a second frontal face 34 of the annular bushing 7 opposite the face 24 and facing the first axial end portion 16 of the metallic sleeve 15.

The first annular lip 13 extends in a cantilever fashion inside the radial bulk of the annular shallow recess 33 and in the immediate vicinity thereof, so that it can be elastically deformed in use, if necessary, inside the shallow recess 33.

As described above, and as clearly illustrated in the FIGURE of the attached drawing, between the annular bushing 7, the first annular lip 13 and the first axial portion 16 there is delimited inside the metallic sleeve 15 and radially on the outside of the first annular lip 13 an annular chamber 35 to be filled with pressurized fluid in use through a radial gap present between the rod 2 and the annular bushing 7 (this gap being small and omitted from the illustration, for the sake of simplicity) and which is designed so that a radially inner lateral wall 36 of the annular bushing 7 forms, in use, a guiding surface for the rod 2 of the shock absorber 3.

Because of the configuration described above, the guiding and sealing unit 1 is extremely simple to produce and fit, and is composed of only two separate elements, consisting of the sealing assembly 8 and the bushing 7, since the sealing ring 20 and the corresponding lips 13 and 27 are produced as a single body, with the shield 14 having been co-molded with the sleeve 15 and fixed physically and chemically by bonding in the course of curing (according to a known process) to the flange portion 25.

It is push-fitted by forcing against the lateral wall 5 inside the shock absorber body 4, so that the static seal 32 seals the open end 6, one edge 37 of which is then bent and/or chamfered against the annular portion 31 of the sealing ring 12.

Also as a result of the described structure, the lip 13 is pressed against the rod 2 more strongly as the pressure inside the shock absorber body 4 increases, thus providing an efficient, reliable dynamic seal, while the lip 27 acts as a dust seal and oil scraper. Additionally, the V-shape of the lips 13, 27, and the fact that both lips extend in a cantilever fashion without any metal support from a common root portion at the edge 26, allows the lips 13, 27 to swing, thus compensating for any misalignment of the rod 2 relative to the axis A in use. The unit 1 is also extremely compact, especially in the axial direction.

All the objects of the invention are therefore achieved.

The invention claimed is:

1. A guiding and sealing unit for a rod of a shock absorber, the unit comprising:
   an annular rod guiding bushing that is engaged in a through-manner by the rod; and
   a sealing assembly operatively coupled with the annular bushing and having:
   a sealing ring made of an elastomeric material and having at least a first annular sealing lip that projects radially and axially towards an axis of symmetry which defines an axial direction of the unit coinciding with an axis of translation of the rod, the first sealing lip being configured to slidingly cooperate with the rod, and
   an annular shield that integrally supports the sealing ring, when viewed in cross section the annular seal has a first radially extending flange having first and second flange ends, the sealing ring positioned on the second flange end, a first axially extending portion being located on the first flange end, a second axially extending portion being connected to the first axially extending portion via a shoulder, a second radially extending flange being located on an end of the second axially extending portion opposite from the shoulder; wherein
   the annular shield integrally supporting the sealing ring and the annular rod guiding bushing such that, upon deflection, the sealing ring can be displaced into a recess in the annular rod guiding bushing, the sealing ring being integrally carried by the first radially extending flange so that the first annular lip extends in a cantilever fashion inside the annular shield, the annular rod guiding bushing being housed inside the second axially extending portion and integrally coupled with the second axially extending portion; and wherein the annular shield is configured to be driven in a fluid-tight manner, against a lateral wall of a body of the shock absorber, to be passed through radially on the inside by the rod of the shock absorber.

2. The unit according to claim 1, wherein the annular shield comprises a metallic sleeve and is delimited by an annular lateral wall, formed by the first and second axially extending portions, having in radial section a substantially L-shaped bend arranged between the second axially extending portion and the second radially extending flange, the bend radially forming inside the metallic sleeve and towards the second axially extending portion an annular shoulder; the annular bushing being arranged abutting against the annular shoulder defined by the bend and being axially locked against the annular shoulder by means of an annular end edge of the second axially extending portion, the edge being bent in an L-shape against a first frontal face of the annular bushing facing the side opposite to the first axially extending portion.

3. The unit according to claim 2, wherein the annular end edge of the second axially extending portion is reduced in thickness in the radial direction with respect to a substantially constant radial thickness of the annular lateral wall of the metallic sleeve constituting the annular shield.

4. The unit according to claim 1, wherein the first axially extending portion is bent in an L-shape on an end opposite from the shoulder between the first and second axially extending portions, the L-shape facing radially inwards so as to form the first radially extending flange, which is embedded in the sealing ring made of elastomeric material to constitute a reinforcing armor; wherein the first annular sealing lip extending radially and axially in a cantilever fashion from a radially inner peripheral edge of the first radially extending flange towards the annular bushing; and wherein the sealing ring having a second annular sealing lip, which extends radially and axially in a cantilever fashion from the second end of the first radially extending flange on the side opposite to the annular bushing to form with the first annular lip, in radial section, a V having its vertex arranged at the second end of the first radially extending flange and end stretches constituted by respective free ends of the first and second annular lip, facing the axis of symmetry.

5. The unit according to claim 4, wherein the second annular lip extends in a cantilever fashion for a greater length than the first annular lip, so that the V formed by the first and second annular lip is asymmetrical.

6. The unit according to claim 1, wherein the first axially extending portion has radially outer and inner transverse dimensions below those of the second axially extending portion, to which it is connected with continuity by a bend which forms the shoulder, so that the second axially extending portion radially delimits on the outside of the first axial end portion an annular recess, which houses a radially outer annular portion of the sealing ring; the radially outer annular portion of the sealing ring extending radially outside the metallic sleeve constituting the annular shield and being designed to define a radially outer static seal of the sealing assembly adapted in use to cooperate in fluid-tight manner with the lateral wall of the body of the shock absorber.

7. The unit according to claim 1, wherein the annular bushing is made of a synthetic plastic material.

8. The unit according to claim 1, wherein the recess in the annular bushing faces towards the first annular lip, the recess being located on a side of the annular bushing opposite from the second radially extending flange, the annular shield not being axially interposed between the first annular lip and the recess in the annular bushing.

9. The unit according to claim 1, wherein between the annular bushing, the first annular lip and the first axially extending portion there is delimited inside a metallic sleeve constituting the annular shield and radially on the outside of the first annular lip an annular chamber adapted to be filled with pressurized fluid through a radial gap present between the annular bushing and the rod; a radially inner lateral wall of the annular bushing being configured to define a guiding surface for the rod of the shock absorber.

\* \* \* \* \*